Jan. 19, 1960  J. E. IRWIN  2,921,554
AIR HORN
Filed Sept. 15, 1958
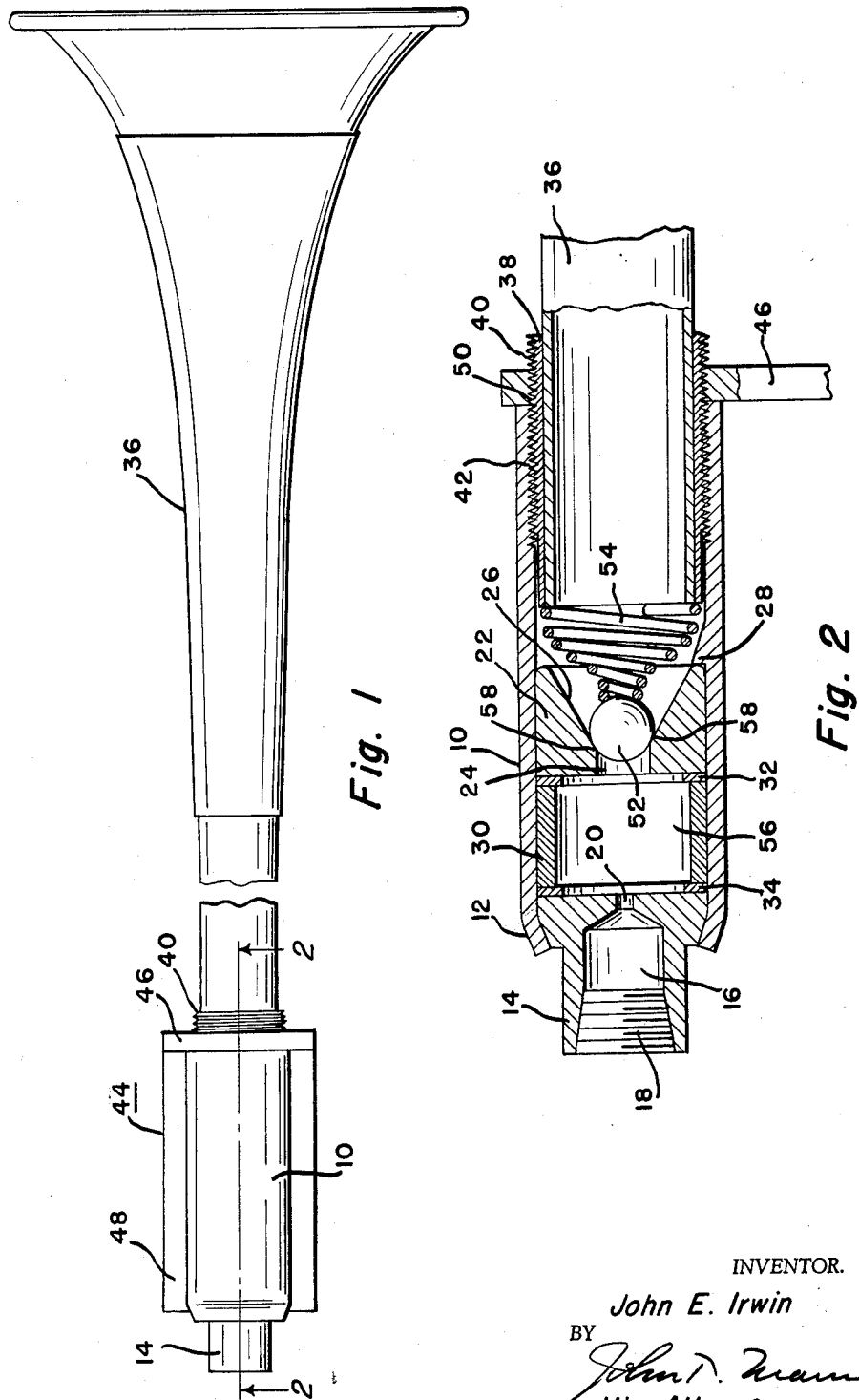
INVENTOR.
John E. Irwin
BY
His Attorney

United States Patent Office 2,921,554
Patented Jan. 19, 1960

2,921,554

AIR HORN

John E. Irwin, Anderson, Ind., assignor to General Motors Corporation, Detroit, Mich., a corporation of Delaware Application September 15, 1958, Serial No. 761,149

3 Claims. (Cl. 116—142)

This invention relates to fluid operated sound producing devices and more particularly to air operated horns that are adapted for use as a signaling device for motor vehicles and the like.

This invention is particularly concerned with the type of air horn wherein the frequency of the note being produced is controlled by a relatively small spring biased element that controls flow of fluid pressure and which is periodically unseated by the applied fluid pressure. In a preferred form of this invention, the spring biased element takes the form of a ball which is periodically unseated by air pressure or other fluid pressure.

This type of horn structure is known to those skilled in the art and it is therefore an object of this invention to provide an improved air horn structure of the type described that has superior sound qualities and greater ease of fabrication.

A more specific object of this invention is to provide an air horn that includes a spring biased ball that is periodically unseated by applied air pressure, there being a restricted port connecting the source of air pressure and a chamber that communicates with a passage that is covered and uncovered by the ball. With this arrangement, the chamber is periodically relieved of air pressure when the ball is unseated and builds up air pressure at a reduced rate through the restricted port when the ball is seated. This provides for frequency stabilization and eliminates the possibility of the ball being held in its unseated position by applied pressure.

Another object of this invention is to provide an air horn which includes a housing that contains a spring biased ball, the housing being in axial alignment with the pressure inlet of the horn and containing a ball seat having a tapered center opening that receives the ball.

Still another object of this invention is to provide an air horn of the type that includes a housing that contains a spring biased air flow controller and wherein a projector is secured to the housing and forms a seat for one end of the spring, the projector being movable with respect to the housing for adjusting the force of the spring.

A further object of this invention is to provide an air horn construction of the type described having a mounting bracket that also serves as a lock nut for holding the parts of the horn in fixed relationship with each other.

Further objects and advantages of the present invention will be apparent from the following description, reference being had to the accompanying drawings, wherein a preferred embodiment of the present invention is clearly shown.

In the drawings:

Figure 1 is a top plan view of an air horn made in accordance with this invention.

Figure 2 is a sectional view taken along line 2—2 of Figure 1.

Referring now to the drawings, the air horn of this invention includes a tubular fitting or housing 10 which contains the various parts of the air horn. The housing 10 is crimped over as at 12 to retain an inlet fitting 14. The inlet fitting has a passage 16 that is internally threaded as at 18 for the reception of a pipe that is connected to a suitable source of fluid pressure such as air. The passage 16 is in communication with a restricted passage 20, the purpose of which will be more fully described hereinafter. A seat member 22 is positioned intermediate the ends of the tubular housing 10 and has a central passage 24 that merges into a tapered opening 26. One end of the seat member 22 engages a projection 28 that is integrally formed with the housing 10. The seat member 22 and inlet fitting 14 are spaced from one another by a tubular spacer member 30. A pair of gaskets 32 and 34 are interposed respectively between the sleeve member 30 and the inlet fitting 14 and seat member 22.

The air horn further includes a sound projector designated in its entirety by reference numeral 36. A sleeve 38 having external threads 40 is welded or otherwise secured to the projector as it best illustrated in Figure 2. The sleeve 38 is threaded into the internally threaded portion 42 of the tubular member 10. The sound projector 36 is hollow as is shown and forms the outlet side of the air horn. An L-shaped mounting bracket generally designated by reference numeral 44 and having legs 46 and 48 is provided for holding the projector in place with respect to the tubular housing 10 and for providing a mounting for the air horn. The leg portion 46 of the bracket has an internally threaded opening 50 which mates with the threaded portion 40 of the sleeve 38. With this arrangement, the portion 46 of the mounting bracket serves as a lock nut for holding the projector 36 and attached sleeve 38 in fixed relationship with the tubular housing 10 when the portion 46 is in its position shown in Figure 2.

A ball member 52 which is preferably formed of plastic material such as nylon (a super polyamide) is seated within the tapered opening 26 and engages the seat member 22 to normally close off the passage 24. A conical spring 54 has one end in engagement with the ball member 52 and has its opposite end engaging the end surfaces of projector 36 and sleeve 38. It will be appreciated that with this arrangement, the compression of spring 54 may be adjusted by rotating the sound projector 36 and thus moving the end of the sound projector relative to the tubular housing 10 through its threaded engagement with the housing. It will also be appreciated that the ball 52 may be formed of a material other than a plastic material and could be a steel ball. It has been found, however, that the nylon ball provides for very satisfactory operation.

The operation of the air horn will now be described. When the inlet fitting 18 is connected with a suitable source of air pressure, the air flows through the passage 16 and through the restricted passage 20 into the chamber 56 formed by the sleeve 30, the inlet fitting 14 and the seat member 22. As air pressure builds up in the chamber 56, the ball at some predetermined air pressure will be unseated when the air pressure overcomes the compressive force of spring 54. When the ball 52 is unseated, the air rushes around the peripheral surface of the ball creating a low pressure area over the area designated by reference numeral 58. Because of this low pressure area, the spring 54 assumes control and forces the ball 52 back into engagement with the seat member 22 to once more close off passage 24. The series of events just described is thus caused to operate periodically at a frequency dependent upon the compressive force of spring 54, the amount of air pressure applied, and various other factors. The ball is thus periodically seated and unseated at a predetermined frequency which interrupts the column of moving air and produces an audible sound.

The purpose of passage 20 is to insure that the chamber 56 will not be too rapidly filled with air once the ball 52 has been unseated and is attempting to return to its seated position. Thus, after the ball becomes unseated and during the time the ball is seated, the air is restricted in its flow into chamber 56 by the passage 20 which is smaller in diameter than either passage 16 or 24. The restriction of passage 20 thus prevents the ball from being permanently unseated as a short time is required to build up sufficient pressure in chamber 56 to unseat ball 52. If the opening 20 were not a restricted one, it is possible that the constant air pressure from passage 16 might hold the ball in its unseated position at all times. If it is desired to adjust the frequency of the air horn, it is only necessary to unthread the bracket 44 slightly and then rotate the projector 36 to compress the spring 54 a greater or a lesser amount. This changes the compressive force applied to the ball member 52 and thus changes the frequency of interruption of the air passing between inlet passage 16 and the interior of projector 36.

The tapered opening 26 in the seat member 22 operates to keep the ball member 52 centered with respect to passage 24 when the ball member is being moved to its closed position by the spring 54.

While the form of embodiment of the invention as herein disclosed constitutes a preferred form, it is to be understood that other forms might be adopted.

What is claimed is as follows:

1. A fluid pressure operated horn comprising, a tubular housing, an inlet fitting positioned within one end of said housing and having a restricted passage extending therethrough, a seat member having a central passage merging into a tapered opening located within said housing and spaced from said inlet fitting to form a chamber therebetween, a reciprocable ball member covering said central passage and positioned within said tapered opening, a hollow projector having one end thereof formed with external threads engaging an internally threaded portion of said housing and spaced from said seat member, a spring positioned between and having opposite ends engaging respectively said ball member and said projector, and a nut member threaded onto the external threaded portion of said projector and engaging said housing, the frequency output of said horn being adjustable by rotation of said projector to vary the compressive force of said spring.

2. A fluid operated horn comprising, a tubular housing having one end thereof crimped over an inlet fitting that is positioned within the housing, a restricted passage in said inlet fitting, a seat member in said housing having a central passage merging into an outwardly flared opening, a sleeve member positioned between said inlet fitting and said seat member and spacing said members a predetermined distance to form a chamber that is in communication with both of said passages, a projector having an externally threaded portion threaded into an internally threaded portion of said housing, a ball covering the central passage of said seat member and positioned within said tapered opening, a spring positioned between said ball and said projector for holding said ball in engagement with said seat member, and a mounting bracket threaded onto the threaded portion of said projector and engaging said housing.

3. The structure according to claim 2 wherein a first gasket is provided that is located between the end of the sleeve member and said inlet fitting and wherein a second gasket is provided that is located between said sleeve member and said seat member.

References Cited in the file of this patent

UNITED STATES PATENTS

| | | |
|---|---|---|
| 1,881,211 | McCune | Oct. 4, 1932 |
| 2,281,539 | Grover | Apr. 28, 1942 |

FOREIGN PATENTS

| | | |
|---|---|---|
| 627,423 | France | Oct. 4, 1927 |